US012341471B2

(12) United States Patent
Ghenai et al.

(10) Patent No.: US 12,341,471 B2
(45) Date of Patent: Jun. 24, 2025

(54) COOLING SYSTEM FOR SOLAR PHOTOVOLTAC PANELS

(71) Applicant: University of Sharjah, Sharjah (AE)

(72) Inventors: Chaouki Ghenai, Sharjah (AE); Fahad Faraz Ahmad, Sharjah (AE); Oussama Rejeb, Sharjah (AE); Maamar Bettayeb, Sharjah (AE); Abdul Kadir Hamid, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 17/573,034

(22) Filed: Jan. 11, 2022

(65) Prior Publication Data

US 2023/0223901 A1     Jul. 13, 2023

(51) Int. Cl.
  *H02S 40/42*      (2014.01)
  *H02S 10/12*      (2014.01)
  *H02S 20/22*      (2014.01)
  *H02S 50/00*      (2014.01)

(52) U.S. Cl.
  CPC ............ *H02S 40/425* (2014.12); *H02S 10/12* (2014.12); *H02S 20/22* (2014.12); *H02S 50/00* (2013.01)

(58) Field of Classification Search
  CPC ........ H02S 40/425; H02S 10/12; H02S 20/22; H02S 50/00; F24F 1/46; F24F 1/48; F24F 1/06; F24F 1/22; H10F 19/00
  USPC .................................................. 136/242–265
  See application file for complete search history.

(56) References Cited

U.S. PATENT DOCUMENTS

| | | | | |
|---|---|---|---|---|
| 6,134,902 A | * | 10/2000 | Curry | H02S 20/30 |
| | | | | 62/235.1 |
| 2011/0232630 A1 | * | 9/2011 | Tsao | F03D 9/25 |
| | | | | 290/55 |
| 2018/0248509 A1 | * | 8/2018 | Dayama | H02S 20/32 |

(Continued)

FOREIGN PATENT DOCUMENTS

| | | | | |
|---|---|---|---|---|
| CN | 107062437 A | * | 8/2017 | |
| CN | 107390599 A | * | 11/2017 | |
| CN | 108431512 A | * | 8/2018 | F24F 5/001 |

(Continued)

OTHER PUBLICATIONS

English Machine Translation for CN 107062437A (Year: 2017).*

(Continued)

*Primary Examiner* — Kourtney R S Carlson
(74) *Attorney, Agent, or Firm* — MH2 Technology Law Group, LLP

(57) ABSTRACT

The present disclosure provides a cooling system facilitating thermal management in a solar photovoltaic (PV) module. The cooling system includes an exhaust fan, operatively coupled to an outlet of a central air conditioning module, the outlet carries waste air from the central air conditioning module. A supporting structure is placed at a predefined distance in front of the exhaust fan to support one or more solar panels. The one or more solar panels are tilted at a predefined angle and a predefined azimuth configured to provide maximum surface area of the back units of the one or more solar panels. The exhaust fan is further configured to direct the waste air and surrounding air towards the back units of the one or more solar panels at a predefined temperature.

14 Claims, 9 Drawing Sheets

(56) References Cited

U.S. PATENT DOCUMENTS

2019/0341876 A1* 11/2019 Webb ............... H01L 21/00
2021/0273606 A1* 9/2021 Suma ............... H02S 10/12

FOREIGN PATENT DOCUMENTS

CN      110242502 A  *  9/2019
KR    20190036126 A  *  4/2019

OTHER PUBLICATIONS

English Machine Translation for CN 107390599A (Year: 2017).*
English Machine Translation for KR20190036126A (Year: 2019).*
English Machine Translation for CN 110242502A (Year: 2019).*
Solangi et al., "A review on global solar energy policy", Elsevier, Renewable and Sustainable Energy Reviews, May 2011, vol. 15, Issue 4, pp. 2149-2163, 15 pages.
Arnulf Jäger-Waldau, "Snapshot of photovoltaics", European Commission, Joint Research Centre (JRC), ResearchGate, EPJ Photovoltaics, 2016, vol. 12, Issue 2, 19 pages.
Stefan Krauter, "Increased electrical yield via water flow over the front of photovoltaic panels", Elsevier, ScienceDirect, Solar Energy Materials & Solar Cells, 2004, vol. 82, pp. 131-137, 7 pages.
Prudhvi & Sai, "Efficiency Improvement of Solar PV Panels Using Active Cooling", IEEE, 2012, pp. 1093-1097, doi: 10.1109/EEEIC.2012.6221543, 5 pages.
Mah et al, "Investigating the Performance Improvement of a Photovoltaic System in a Tropical Climate using Water Cooling Method", Elsevier, ScienceDirect, Energy Procedia, 2019, vol. 159, pp. 78-83, 6 pages.
Sato & Yamada, "Review of photovoltaic module cooling methods and performance evaluation of the radiative cooling method", Elsevier, Renewable and Sustainable Energy Reviews, 2019, vol. 104, pp. 151-166, 16 pages.
Jamali, et al., "Enhanced power generation through cooling a semi-transparent PV power plant with a solar chimney", Elsevier, Energy Conversion and Management, 2018, vol. 175, pp. 227-235, 9 pages.
Biwole et al., "Improving the performance of solar panels by the use of phase-change materials", Phtovoltaic Technology, World Renewable Energy Congress, Sweden, 2011, vol. 57, pp. 2953-2960, 8 pages.
Wu & Xiong, "Passive cooling technology for photovoltaic panels for domestic houses", International Journal of Low-Carbon Technologies, Jun. 2014, vol. 9, Issue 2, pp. 118-126, 9 pages.
Syafiqah et al., "Simulation study of air and water cooled photovoltaic panel using ANSYS", Journal of Physics: Conference Series, 2017, vol. 908, Issue 1, 8 pages.
Correa-Betanzo et al., "Module temperature models assessment of photovoltaic seasonal energy yield", Elsevier, Sustainable Energy Technologies and Assessments, 2018, vol. 27, pp. 9-16, 8 pages.
Brinkworth et al, "Thermal Regulation of Photovoltaic Cladding", Solar Energy, 1997, vol. 61, Issue 3, pp. 169-178, 10 pages.
Valeh-e-Sheyda et al., "Using a wind-driven ventilator to enhance a photovoltaic cellpower generation", Elsevier, Energy and Buildings, 2014, vol. 73, pp. 115-119, 5 pages.
Teo et al., "An active cooling system for photovoltaic modules", Elsevier, ScienceDirect, Applied Energy, 2012, vol. 90, pp. 309-315, 7 pages.
Erdem Cuce & Pinar Mert Cuce, "Improving thermodynamic performance parameters of silicon photovoltaic cells via ait cooling", International Journal of Ambient Energy, 2014, vol. 35, Issue 4, pp. 193-199, 8 pages.
Tiwari et al., "Effect of Forced Convection Cooling on Performance of Solar Photovoltaic Module in Rooftop Applications", ResearchGate, Advances in Energy Research, 2020, vol. 1, pp. 159-172, 7 pages.
Marugán, A. P., & Márquez,, "SCADA and Artificial Neural Networks for Maintenance Management", International Conference on Management Science and Engineering Management, 1988, 11 pages.
Fausto Pedro Garcia Márquez et al., "A New Ranking Method Approach for Decision Making in Maintenance Management", Springer, Proceedings of the Seventh International Conference on Management Science and Engineering Management, 2013, pp. 27-38, 17 pages.
Carlos Quiterio Gómez Muñoz et al., "New Pipe Notch Detection and Location Method for Short Distances employing Ultrasonic Guided Waves", ResearchGate, Acta Acustica united with Acustica, 2017, vol. 103, Issue 5, pp. 772-781, 12 pages.
Quater et al., "Light Unmanned Aerial Vehicles (UAVs) for Cooperative Inspection of PV Plants", IEEE Journal of Photovoltaics, 2014, vol. 4, Issue 4, pp. 1107-1113, 7 pages.
Munoz et al., "An Investigation into Hot-Spots in Two Large Grid-Connected PV Plants", Progress in Photovoltaics: Research and Applications, 2008, vol. 16, Issue 8, pp. 693-701, 9 pages.
Sequeira et al., "Improvement of power output from solar panel using water cooling system", ResearchGate, Glob. J. Adv. Eng. Technol., 2016, vol. 5, Issue No. 1, pp. 58-63, 6 pages.

* cited by examiner

COOLING SYSTEM FOR SOLAR PHOTOVOLTAC PANELS

FIELD OF THE INVENTION

The present disclosure relates to thermal management in solar photovoltaic (PV) module. In particular, the present disclosure pertains to back cooling of solar photovoltaic (SPV) panels, through the application of waste air from a centralized air conditioning system.

BACKGROUND OF THE INVENTION

Environmental factors, particularly irradiance and temperature affect power generation of solar photovoltaic panel. The solar cell absorbs sunlight, and a partial amount of light is converted to electrical energy, while the remaining portion generates heat and increases temperature. The SPV systems face two major challenges through temperature degradation and soiling, especially in hotter countries. The losses, including optical and ohmic losses, also contribute to the many issues faced by SPV systems. Among all system losses, the thermal effect is the most contributing factor in the deterioration of the performance of the solar system. As the temperature rises from standard testing conditions (STC), the output of SPV panels degrades accordingly. In typical summer days, in certain places, the operating temperature may reach up to 70° C., which can result in 20% power loss as of the rated power at STC. Even, the rise of 1° C. in the operating temperature typically causes 0.45% reduction in relative efficiency, formally termed as the temperature coefficient of power. It is also reported that every increase of 10° C. in the operating temperature of the SPV panel will double the degradation rate. Hence, an effective solar panel cooling methodology and maintenance policy are essential to improve power system efficiency and reliability.

Contemporary cooling systems to compensate for the adverse effect of temperature can be broadly categorized as passive and active cooling methods. The passive cooling methods include the use of phase change material (PCM), a heat pipe, and an air duct while use of water, forced air cooling, and hybrid cooling techniques are categorized as active methods. The passive solutions are not effective due to the low cooling effect, high cost, bulky system and environmental impact of the materials used. On the other hand, active cooling methods have the disadvantages of unavoidable parasitic losses due to the use of a water pump, fans and the consumption of electric energy. The cooling systems are often complicated and expensive and difficult to assemble during installation or uninstallation.

There is, therefore, a need to provide an efficient, optimum, and cost-effective solution that can obviate the above-mentioned limitations and provide efficient thermal management and longevity to SPV systems.

SUMMARY OF THE INVENTION

The present disclosure provides cooling system facilitating thermal management in a solar photovoltaic (SPV) module. According to an aspect, the system may include an exhaust fan, a supporting structure, an air conditioning module and one or more solar photovoltaic panels. The exhaust fan may be operatively coupled to an outlet of the central air conditioning module, the outlet configured to carry waste air from the central air conditioning module. The supporting structure may be placed at a predefined distance in front of the exhaust fan, the supporting structure configured to support one or more solar panels such that a back unit of each of the solar panel face the front of the exhaust fan. The one or more solar panels may be tilted at a predefined angle and a predefined azimuth configured to provide maximum surface area of the back units of the one or more solar panels. The exhaust fan may be configured to direct the waste air and surrounding air towards the back units of the one or more solar panels at a predefined temperature.

In an aspect, a plurality of devices may be operatively coupled to the system.

In an aspect, the plurality of devices may be further coupled to one or more computing devices.

In an aspect, the plurality of devices may include a plurality of irradiance sensors, a plurality of temperature sensors, one or more anemometers, and one or more cameras.

In an aspect, the plurality of irradiance sensors may be configured to sense and collect a set of irradiance signals from the system.

In an aspect, the plurality of temperature sensors may be configured to sense and collect a set of temperature signals from the system.

In an aspect, the one or more anemometers may be configured to sense and collect a set of wind speed and direction from the system.

In an aspect, the one or more cameras may be configured to collect a set of images from the system.

In an aspect, the one or more computing devices may be configured to receive a set of data packets, the set of data packets may include the set of irradiance signals, the set of temperature signals, the set of wind speed and direction and the set of images.

In an aspect, the one or more computing devices may be configured to monitor the system based on the set of data packets received.

In an aspect, a wind turbine may be placed at a second predefined distance in front of the exhaust fan.

In an aspect, the wind turbine may be operatively coupled to a renewable energy generation unit.

In an aspect, the combination of the wind turbine and the renewable energy generation unit may be configured to harvest potential energy from the waste air from the exhaust fan and convert the potential energy into electric energy.

In an aspect, the one or more solar panels may include identical monocrystalline SPV panels.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosures as defined by the appended claims.

Embodiments explained herein relate to an efficient, optimum, and cost-effective solution that can obviate the abovementioned limitations and back cooling of solar photovoltaic (SPV) panels, through the application of waste air from a centralized air conditioning system.

A general objective of the present disclosure is to provide a novel PV cooling system of the waste air of the air conditioning system in managing the lower operating temperature, especially in the peak summer season, and to provide a novel PV cooling system that enhances the performance of the SPV panel by keeping lower operating temperature. A general object of the present disclosure is also to provide a novel PV cooling system that ensures development of a correlation between IR-measured temperature and electrical power by the SPV panel for remote performance evaluation.

Figure 1:
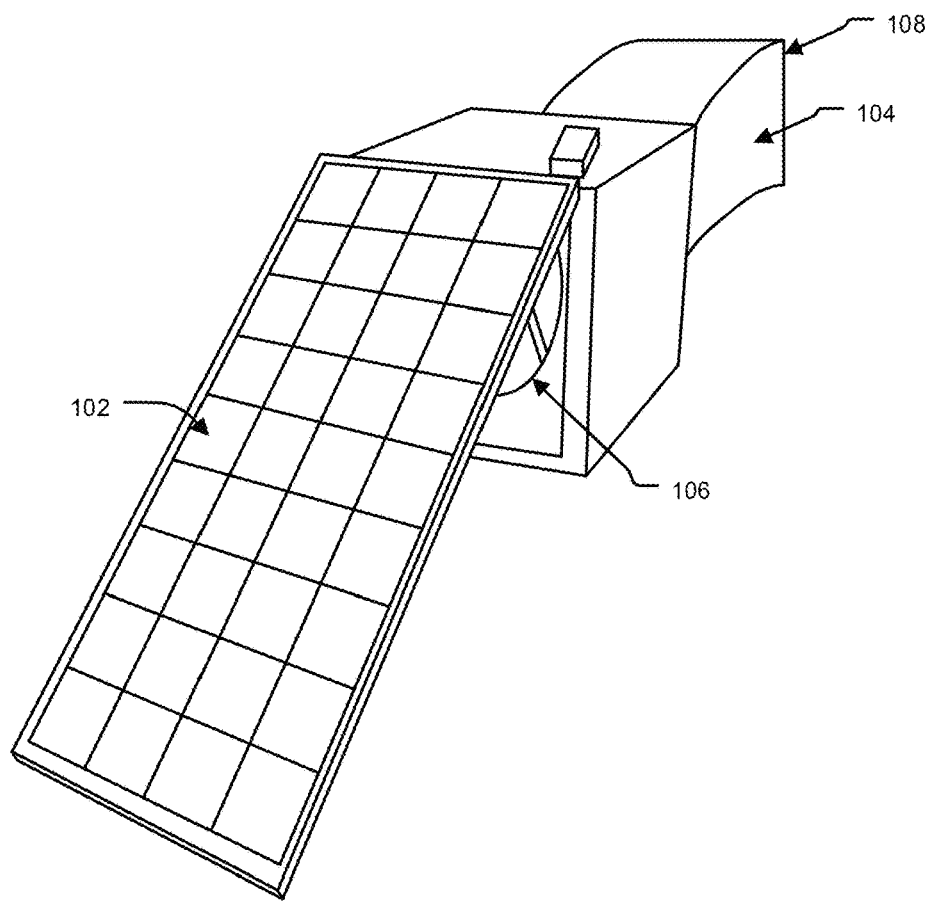
FIG. 1 illustrates an exemplary representation of the proposed cooling system, in accordance with an exemplary embodiment of the present disclosure.

Referring to FIG. 1, the proposed system (100) facilitating thermal management in a solar photovoltaic (SPV) module (also referred to as the Heating, Ventilation, and Air Conditioning (HVAC) system herein). The system (100) may include an exhaust fan (106). The exhaust fan (106) may be of a predefined shape and size. The exhaust fan (106) can be operatively coupled to an outlet (104) of a central air conditioning module (108). The outlet (104) can carry waste air from the central air conditioning module (108).

Further, the system (100) may include a supporting structure (not shown in FIG. 1) placed at a predefined distance in front of the exhaust fan (106). The supporting structure can be configured to support one or more solar panels (102) such that a back unit of each of the solar panel face the front of the exhaust fan (106). The one or more solar panels (102) may be tilted at a predefined angle and a predefined azimuth configured to provide maximum surface area of the back units of the one or more solar panels (102). In a way of example and not as a limitation, the solar panel (102) can be placed in front of the exhaust fan (106) with the predefined tilt angle of 36° and the azimuth of 120° from the south (North-West) but not limited to the like.

In an aspect, the exhaust fan (106) can direct the waste air and surrounding air towards the back units of the one or more solar panels (102) at a predefined temperature. In addition, in an exemplary implementation, the predefined distance between the supporting structure and the exhaust fan (106) can allow the exhaust air to spread freely from a right to a left side. The passage can open in order not to restrict the path of airflow and not to put any additional pressure on the exhaust fan.

Figure 4:
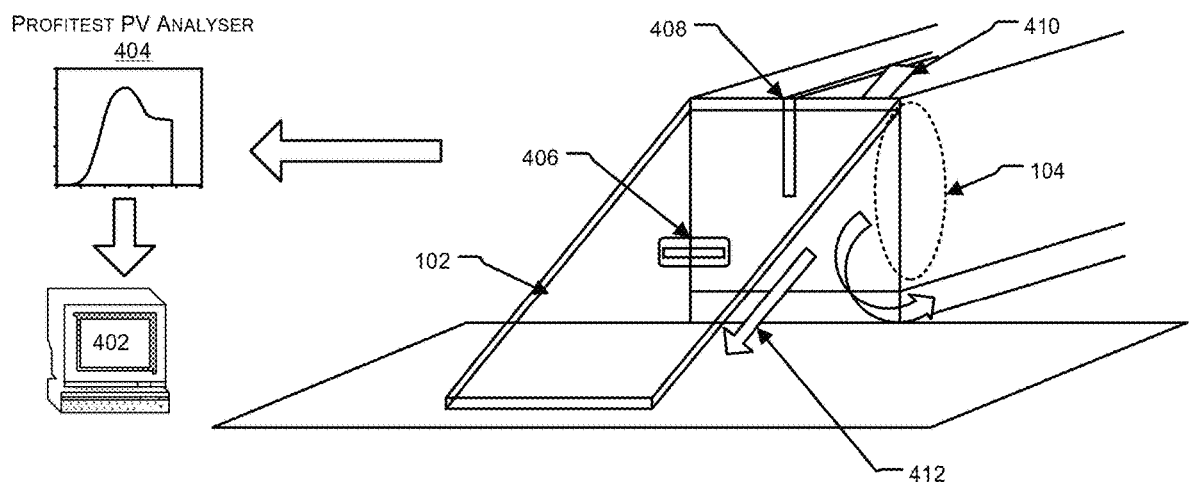
FIG. 4 illustrates an exemplary representation of a system architecture for monitoring the proposed system, in accordance with an exemplary embodiment of the present disclosure.

Further, in an aspect a plurality of devices may be operatively coupled to the system. The plurality of devices may be further coupled to one or more computing devices. In a way of example and not a limitation, the plurality of devices may include a plurality of irradiance sensors, a plurality of temperature sensors (410) (Ref. FIG. 4), one or more anemometers (408), and one or more cameras (406) but not limited to the like. The plurality of irradiance sensors may be configured to sense and collect a set of irradiance signals from the system (100). In addition, the plurality of temperature sensors (410) may be configured to sense and collect a set of temperature signals from the system while the one or more anemometers may be configured to sense and collect a set of wind speed and direction from the system.

Additionally, the one or more cameras (406) may be configured to collect a set of images from the system.

In an embodiment, the one or more computing devices may be configured to receive a set of data packets, the set of data packets may include the set of irradiance signals, the set of temperature signals, the set of wind speed and direction and the set of images. The one or more computing devices can monitor the system (100) based on the set of data packets received.

Figure 6:
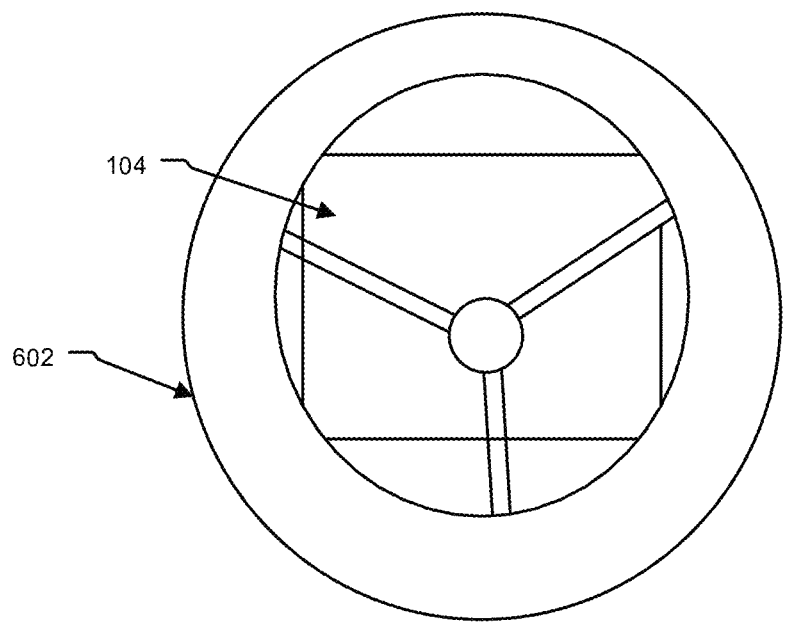
FIG. 6 illustrates an exemplary representation of a wind turbine unit, in accordance with an exemplary embodiment of the present disclosure.

Alternatively, a wind turbine (602) (Ref. FIG. 6) may be placed at a second predefined distance in front of the exhaust fan (106). The wind turbine may be operatively coupled to a renewable energy generation unit. The combination of the wind turbine and the renewable energy generation unit may be configured to harvest potential energy from the waste air from the exhaust fan (106) and convert the potential energy into electric energy.

The cooling of the solar PV panels (102) can be used for summer where the ambient and solar cell temperatures are much higher than the cold exhaust air from the HVAC system (29-30° C.). In an exemplary embodiment, the system (100) can provide a cooling configuration and a cooling strategy with the predefined temperature of at least 29° C. but not limited to it and a predefined air speed flow rate of at least 8 m/s but not limited to it for cooling the solar PV.

Figure 2:
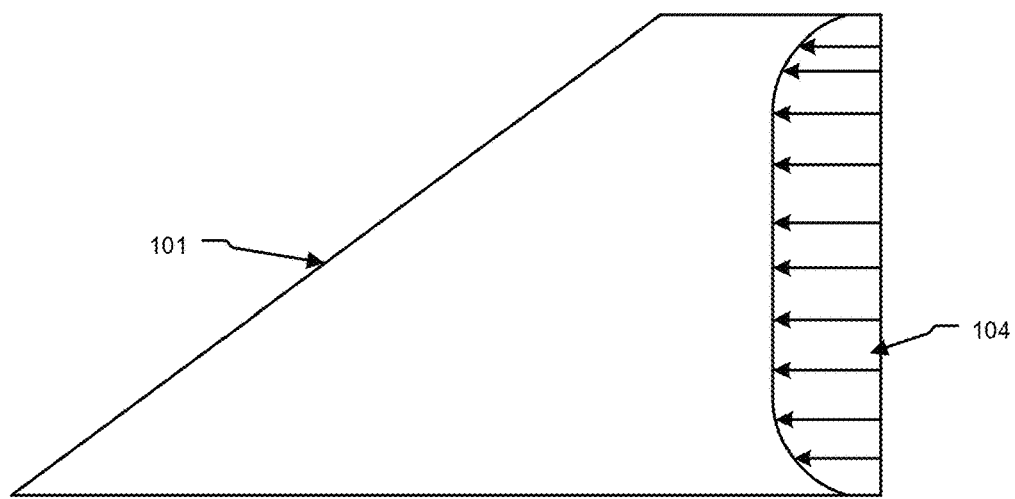
FIG. 2 illustrates an exemplary diagram of the proposed cooling system, in accordance with an exemplary embodiment of the present disclosure.

FIG. 2 illustrates an exemplary diagram of the proposed cooling system, in accordance with an exemplary embodiment of the present disclosure. As illustrated, in FIG. 2, the direction of the exhaust or wasted air directed towards the solar panel (102).

Figure 3:
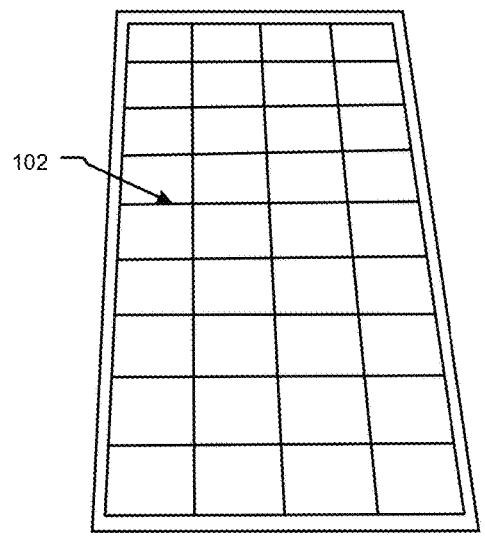
FIG. 3 illustrates exemplary representation of a conventional SPV placement, in accordance with an exemplary embodiment of the present disclosure.

FIG. 3 illustrates exemplary representation of a conventional SPV placement, in accordance with an exemplary embodiment of the present disclosure.

In an exemplary implementation, the operating temperature of the solar panel plays a pivotal role in the conversion of sunlight to electricity. The power and the electrical efficiency of the SPV panel depend on the operating temperature. The output power of the SPV panel can be expressed as follow, $$P_m = I_m V_m = (FF) I_{sc} V_{oc} \quad (1)$$

$$P = G \tau \eta_{STC} A [1 - \beta_{STC}(T_{pv} - T_{STC})] \quad (2)$$

$$P = P_{STC} G/G_{STC} [1 - \beta_{STC}(T_{pv} - T_{STC})] \quad (3)$$

Where $P_{STC}$ is the power at STC and $G_{STC}$ is 1000 W/m²
where G is the solar irradiance, t is the transmittance of PV glazing, $\eta_{STC}$ is the electrical efficiency at STC, A is the area of the PV panel, $\beta_{STC}$ is the temperature coefficient of power, $T_{pv}$ is the PV panel temperature and $T_{STC}$ is 25° C.

The energy balance of the proposed SPV panel through the use of back cooling from waste air is expressed as follows:

$$\rho_{pv} A_{pv} C_{pv} \delta_{pv} \frac{\partial T_{pv}}{\partial t} = \qquad (4)$$
$$-Q_{forced,air} + Q_{in,pv} - Q_{con,front,pv-a} - Q_{con,back,pv-a} - Q_{rad,pv-sky} - Q_{elec}$$

where $\rho_{pv}$, $C_{pv}$, $A_{pv}$ and $\delta_{pv}$ represent, respectively, the density, the specific heat, surface, and the thickness of the PV module. The amount of solar energy absorbed by the module ($Q_{in,pv}$) is estimated by the following equation:

$$Q_{in,pv} = \alpha_{pv} A_{pv} G \qquad (5)$$

The front convective flux exchanged between the PV and the ambient air ($Q_{con,front,pv-a}$) is determined by the following expression:

$$Q_{con,front,pv-a} = A_{pv} h_{con,front,pv-a} (T_{pv} - T_a) \qquad (6)$$

where ($h_{con,front,pv-a}$) is convective heat transfer.

The back convective flux exchanged between the PV and the ambient air ($Q_{con,back,pv-a}$) is determined by the following expression:

$$Q_{con,back,pv-a} = A_{pv} h_{con,back,pv-a} (T_{pv} - T_a) \qquad (7)$$

where ($h_{con,back,pv-a}$) is convective heat transfer. The exchanged radiative flux between the PV and the sky $Q_{ray,pv-sky}$ is estimated by the following expression:

$$Q_{rad,pv-sky} = A_{pv} h_{ray,pv-sky} (T_{pv} - T_{sky}) \qquad (8)$$

Where $h_{ray,pv-sky}$ is the radiation heat transfer coefficient.

FIG. 4 illustrates an exemplary representation of a system architecture for monitoring the proposed system, in accordance with an exemplary embodiment of the present disclosure. In a way of example and not as a limitation, FIG. 4 illustrates a system architecture (400) for monitoring the proposed system. At least two identical monocrystalline SPV panels (102) and a selected exhaust fan (106) of the centralized AC system (108) are the main components. A Profitest PV analyser (404) with irradiance and temperature sensors (410), a hot wire anemometer (408) and a fluke Tix620 IR camera (406) but not limited to the like can be used to record the data. In an exemplary implementation, at least two typical monocrystalline solar panels of 150 W each can be used. The examined solar panel is placed in front of an exhaust fan with a tilt angle of 36° and the azimuth of 120° from the south (North-West) as shown in FIG. 4. This position is chosen to directly place the solar panel in front of the exhaust fan without the need of any mechanical structure. In addition, the chosen position allows the exhaust air to spread freely from the right and left sides, which are kept open in order not to restrict the path of airflow and not to put any additional pressure on the exhaust fan. An analyser such as but not limited to Profitest PV analyser (404) can be operatively coupled to a computing device (402) such as a laptop, PC, smart phone and the like. The Profitest PV analyser (404) can be used to get I-V and P-V curves in real-time. The data can be recorded with a resolution of at least 15 min. The hotwire anemometer (408) can be employed to record the speed and temperature of the exhaust air. The fluke Tix620 IR camera (406) can be used to capture the IR thermogram of the solar panel after each hour in order to compare the surface temperature with the back-surface temperature as measured by a thermocouple.

Figure 5A:
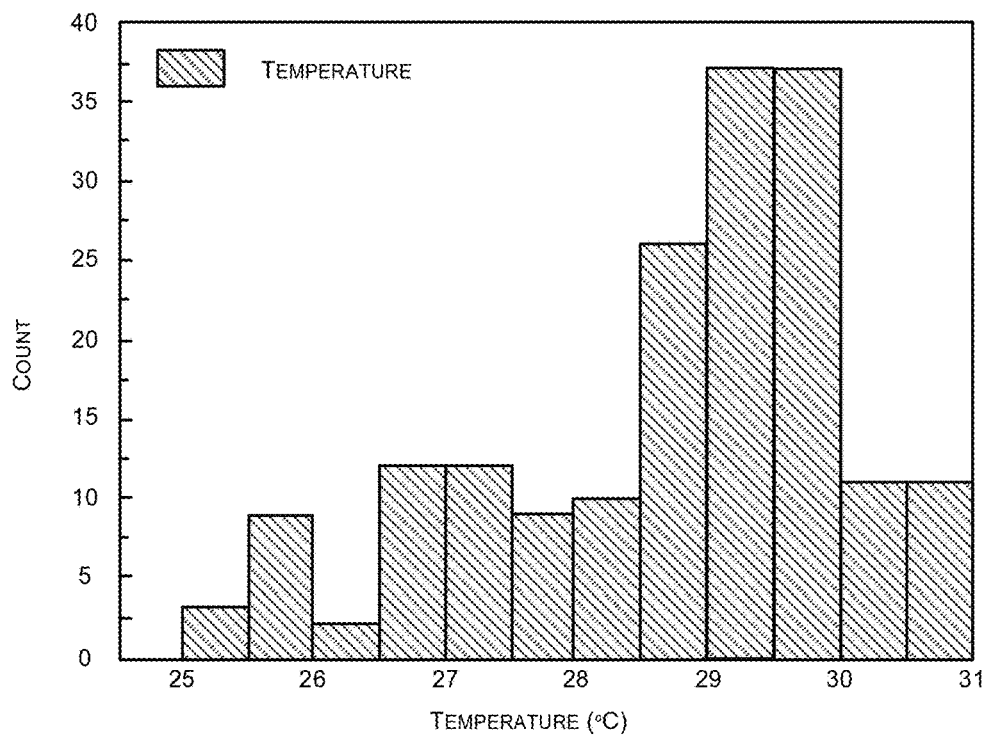
FIGS. 5A-5K illustrate representations of exemplary analysis of the proposed system, in accordance with an exemplary embodiment of the present disclosure.
Figure 5B:
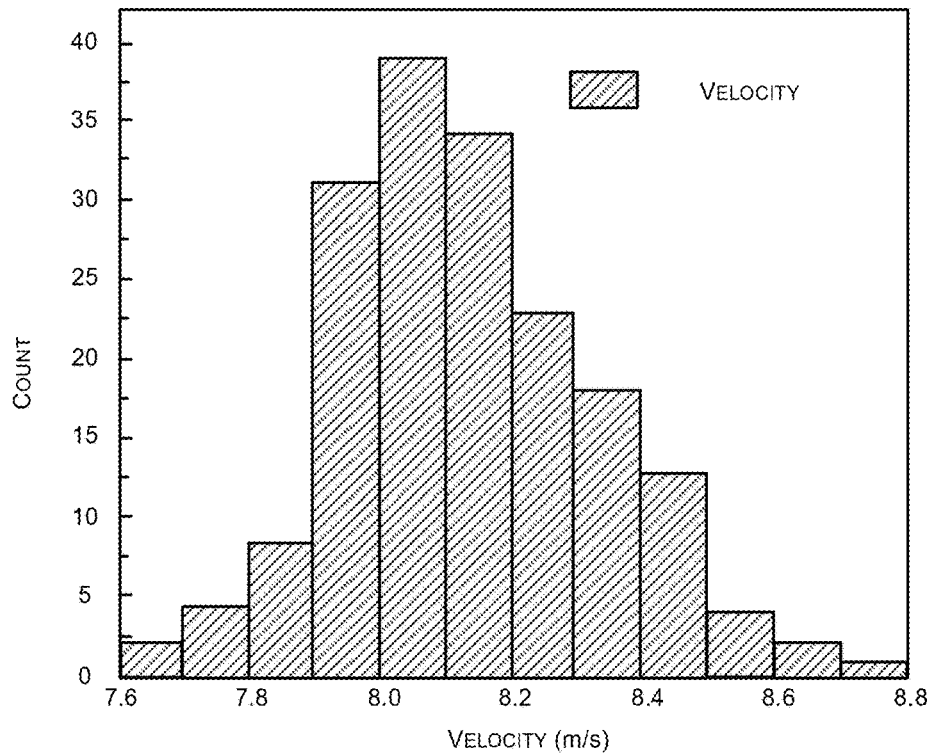
Figure 5C:
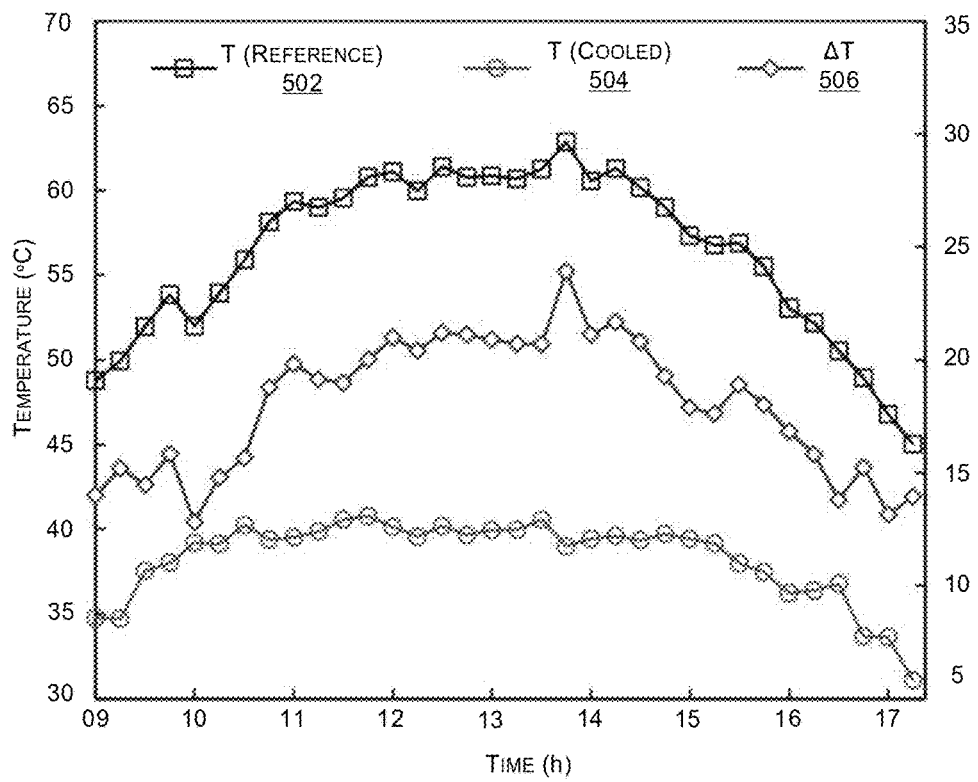

FIGS. 5A-5K illustrate representations of exemplary analysis of the proposed system, in accordance with an exemplary embodiment of the present disclosure. As illustrated in FIGS. 5A-5G, the analysis for solar cell temperature reduction, solar PV power output and electrical efficiency show improved results with the proposed cooling strategy. Real time measurements of the performance of the solar PV with (cooled) and without cooling (reference) are obtained with the present invention that clearly shows the benefits of the proposed cooling technology. FIG. 5A illustrates a temperature profile of the proposed system (100) while FIG. 5B illustrates an exhaust air velocity distribution of the proposed system (100). In an exemplary implementation, evolution of the temperature of the reference (without cooling) (502) and the proposed system (504) is illustrated in FIG. 5C. The reference panel has a natural air convection process for heat exchange. The temperature of the reference panel is 48.8° C. at 9:00 a.m. The recorded peak temperature is 62.88° C. at 2:20 p.m. The average temperature of the reference panel over the observed time is 56.36° C. Meanwhile, the examined solar panel is placed in front of the exhaust opening of the centralized air conditioning system and to enhance the heat exchange with the forced air convective mechanism. On the front surface of the SPV panel, convective heat dissipation happens due to natural air, while on the back surface, natural air combines with directed air from the exhaust fan to dissipate the heat. The average temperature of the exhaust air that hits the SPV solar panel and results in the reduction of its surface temperature is 28.7° C. The temperature of the cooled solar panel is 34.8° C. at 9:00 a.m. and it rises to the peak value of 40.76° C. at noon. The average temperature of the cooled solar panel over the observed time is 38.31° C., i.e. 18.05° C. less than the average temperature of the reference panel. The reduction in temperature is 32.03% as compared to the reference panel, which is significant. The low operating temperature leads to less thermal stress, improved electrical performance and endurance of the SPV panel. The result of temperature variation has shown the effectiveness of the proposed cooling strategy.

Figure 5D:
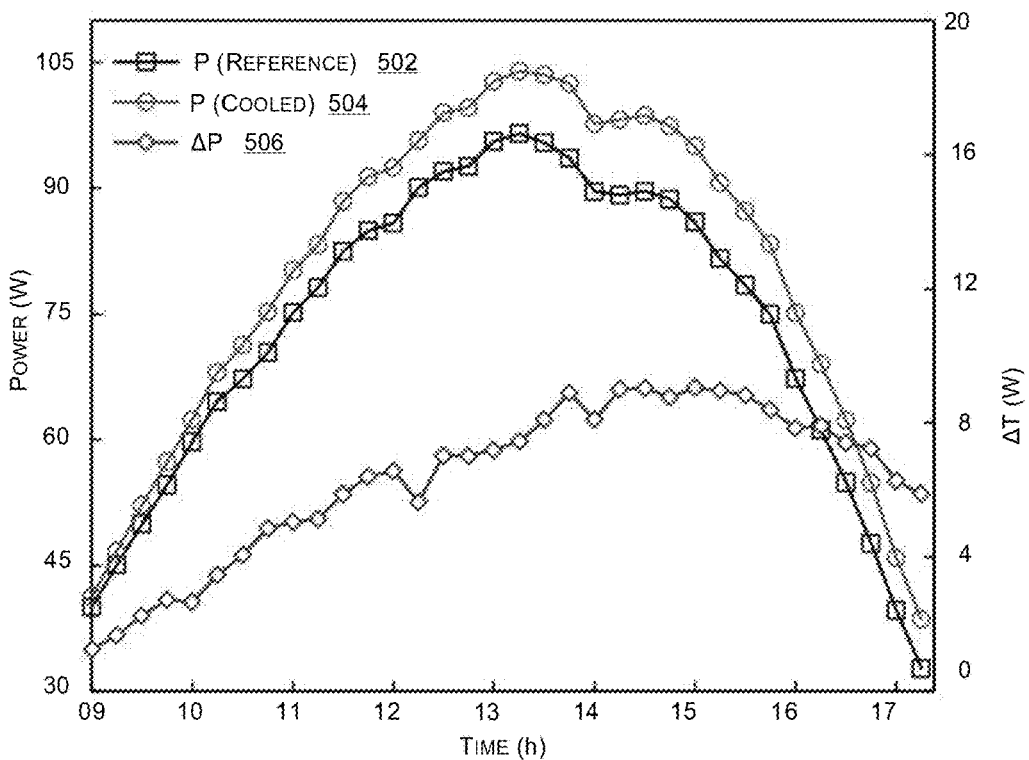
Figure 5E:
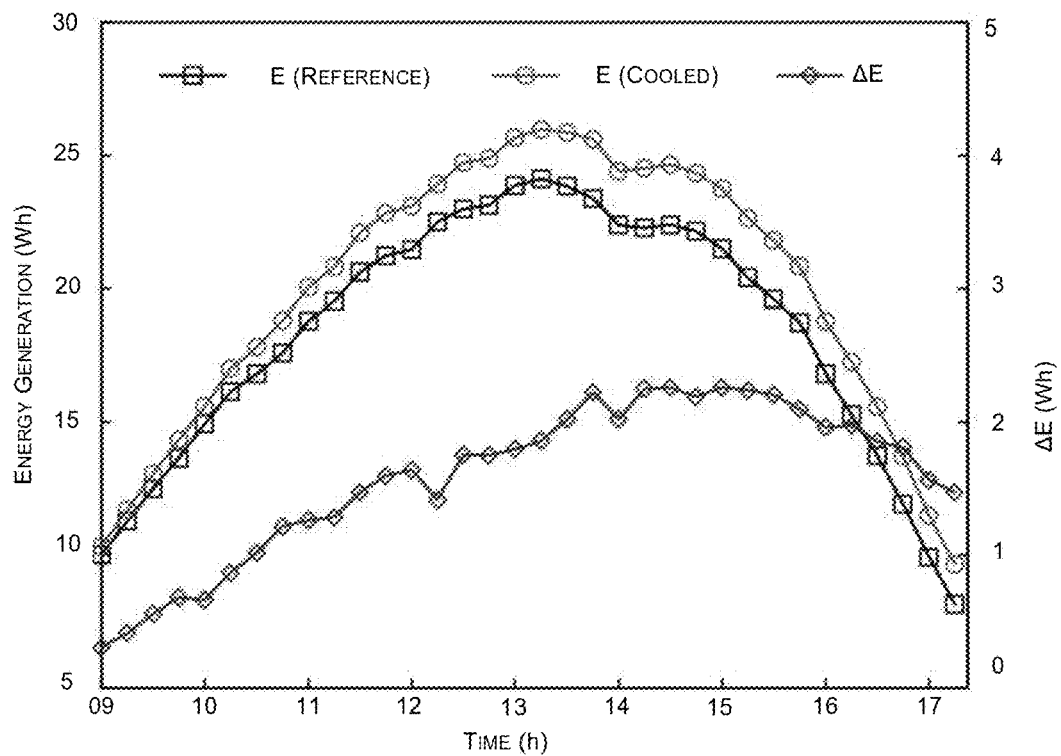
Figure 5F:
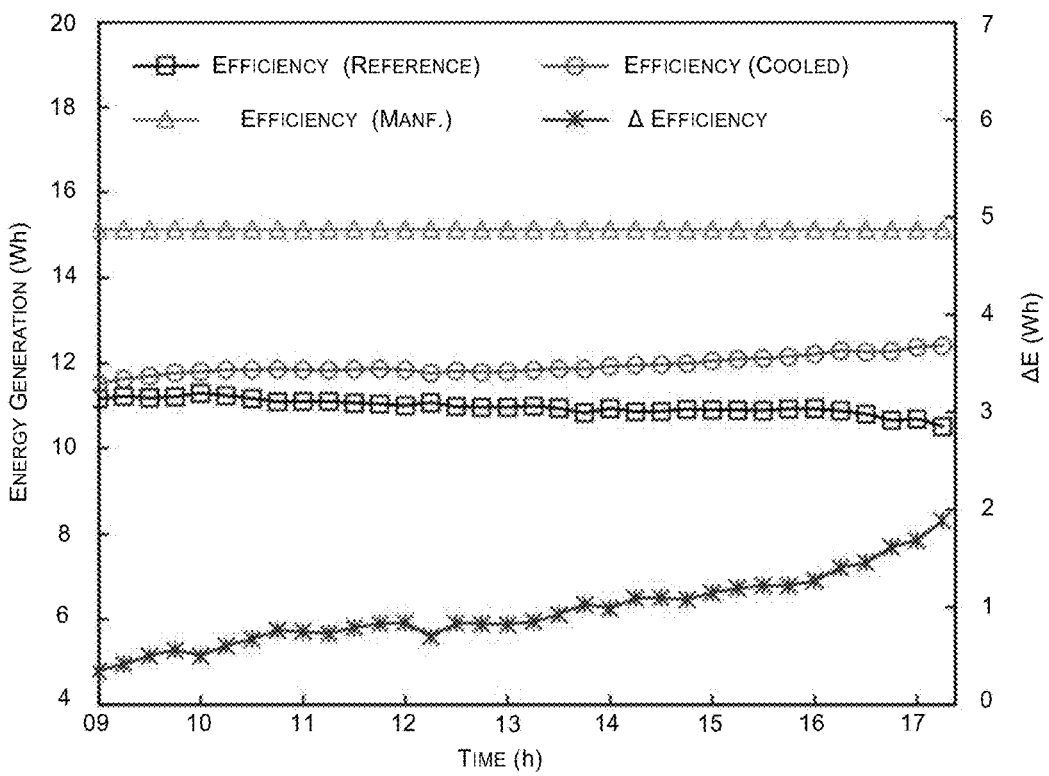
Figure 5G:
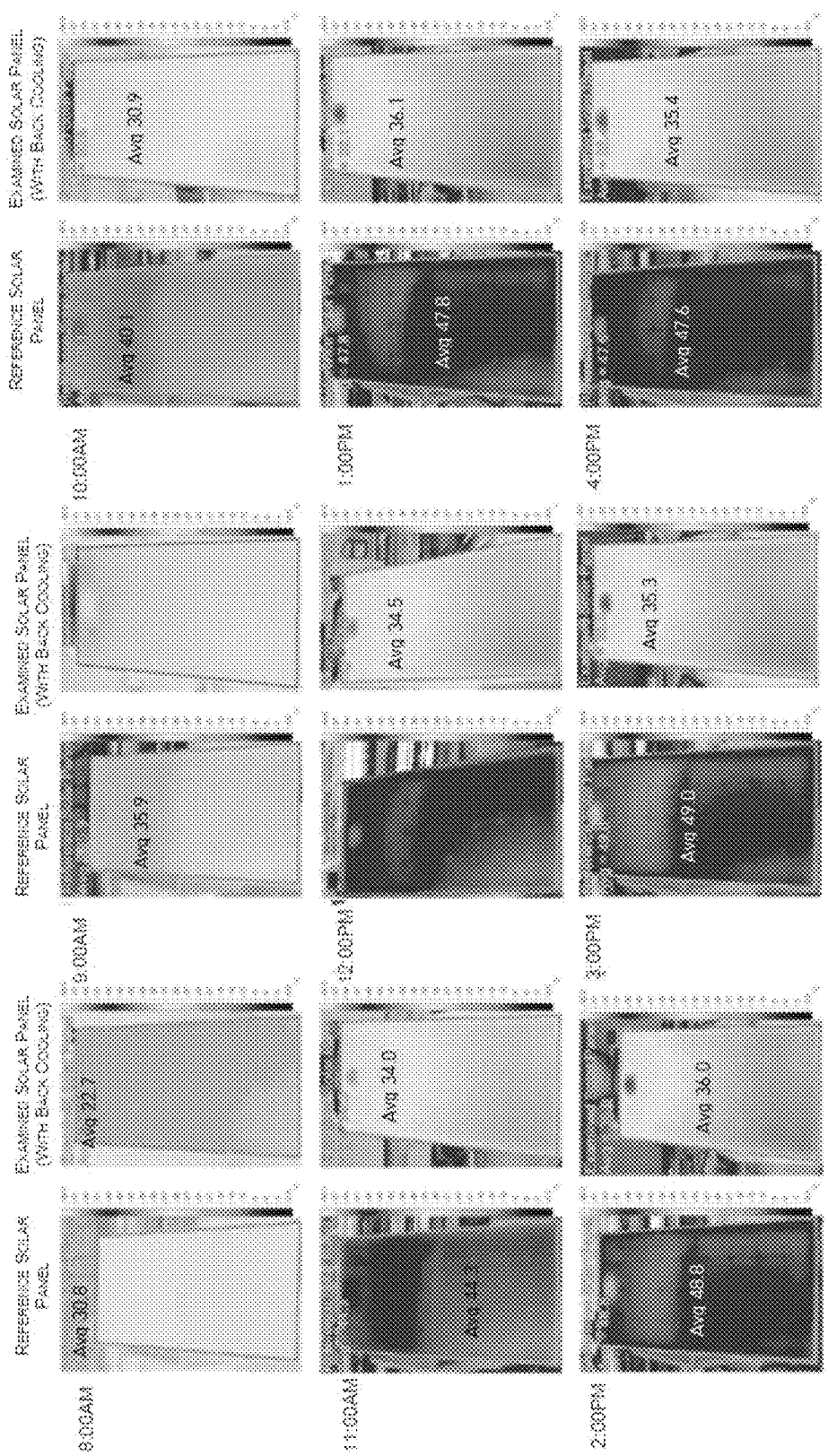

The temperature of the reference panel is 48.8° C. at 9:00 a.m. The recorded peak temperature is 62.88° C. at 2:20 p.m. The average temperature of the reference panel over the observed time is 56.36° C. The system (100) can facilitate forced cold air from the exhaust system to exchange heat with the back of the solar PV panel. A reduction of the solar cell temperature by at least 32.03% but not limited to it is obtained using this cooling technology compared to the reference panel, which is significant. The low operating temperature leads to less thermal stress, improved electrical performance and endurance of the SPV panel. The result of the solar cell temperature (Ref. FIG. 5C), power output (Ref. FIG. 5D), energy generation (Ref. FIG. 5E) and the electrical efficiency (Ref. FIG. 5G) of the proposed system have shown the effectiveness of the proposed system compared to the ones reported in prior art documents. The calculated average powers by using Eq. (3) for both the reference and the examined solar panels are 88.84 W and 95.97 W, respectively; while average measured powers are 73.40 W and 79.75 W, for the reference and the examined solar panels, respectively. The deviation of measured values from the calculated ones is due to the degradation of the solar panel's material and the electrical system losses that are not included in Eq. (3). The degradation factor for both panels is 0.83. The maximum power produced by the reference panel is 96.5 W, while the utmost power generated by the examined panel with a back cooling is 103.96 W, as in FIG. 5D. The energy generated by the reference panel is 623.90 Wh/day. An increase of 8.65% in energy generation has been noted by adopting back cooling from waste air. This proves the effectiveness of the proposed method in coping with the thermal degradation of the SPV panel without the use of any additional energy. The energy produced by the cooled SPV panel we examined is 677.89 Wh/day as in FIG. 5D. The waste air is used from the air conditioning system; hence, the proposed setup will work as an energy-recovery system improving the overall efficiency of the system. The electrical efficiency of the solar panel at STC is 15.15%, as provided by the manufacturer. The variation of the efficiency of the reference and the examined solar panel is presented in FIG. 5E. The average efficiencies of the reference and the examined solar panels are 10.98% and 11.95%, respectively. The average increment of 0.97% in electrical efficiency has been noted by the proposed cooling method from waste air. The enhancement of electrical efficiency is noticeable when the temperature of the SPV panel elevates at noontime. The same observation has been noted when the irradiance level is lower, but the temperature of the solar panel is still considerably higher than 25° C. (it can be observed in evening time). The performance ratio of the reference and the examined SPV systems are 72.39% and 78.65%. An improvement of 8.65% has been observed.

Figure 5H:
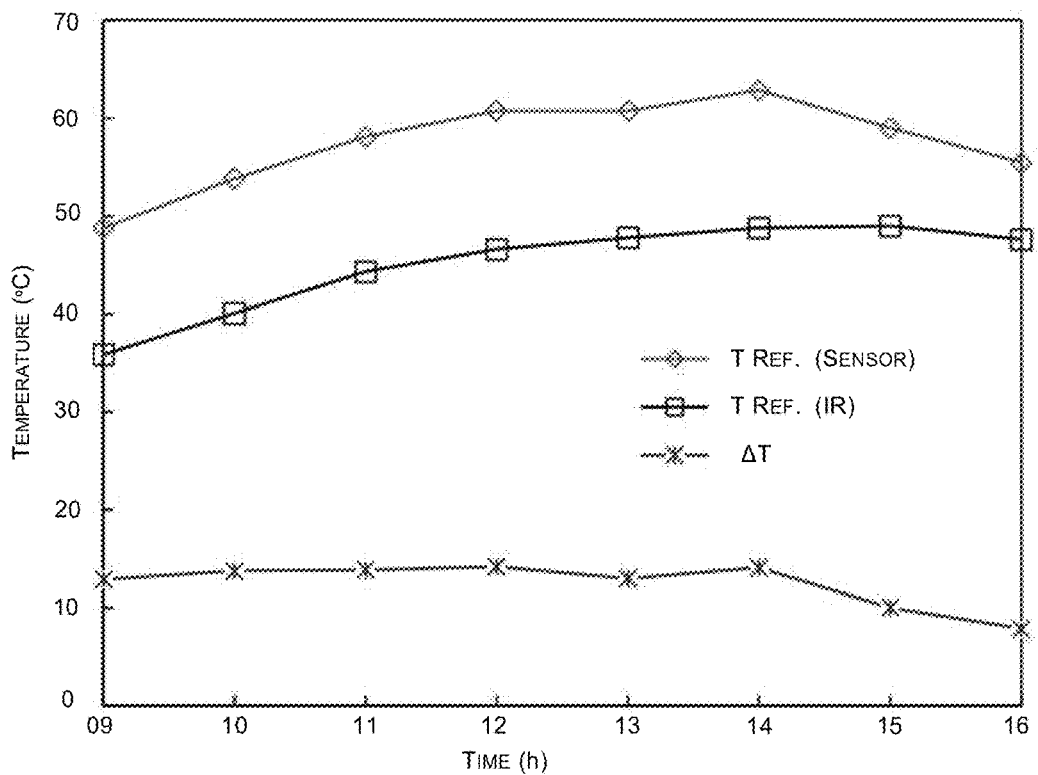
Figure 5I:
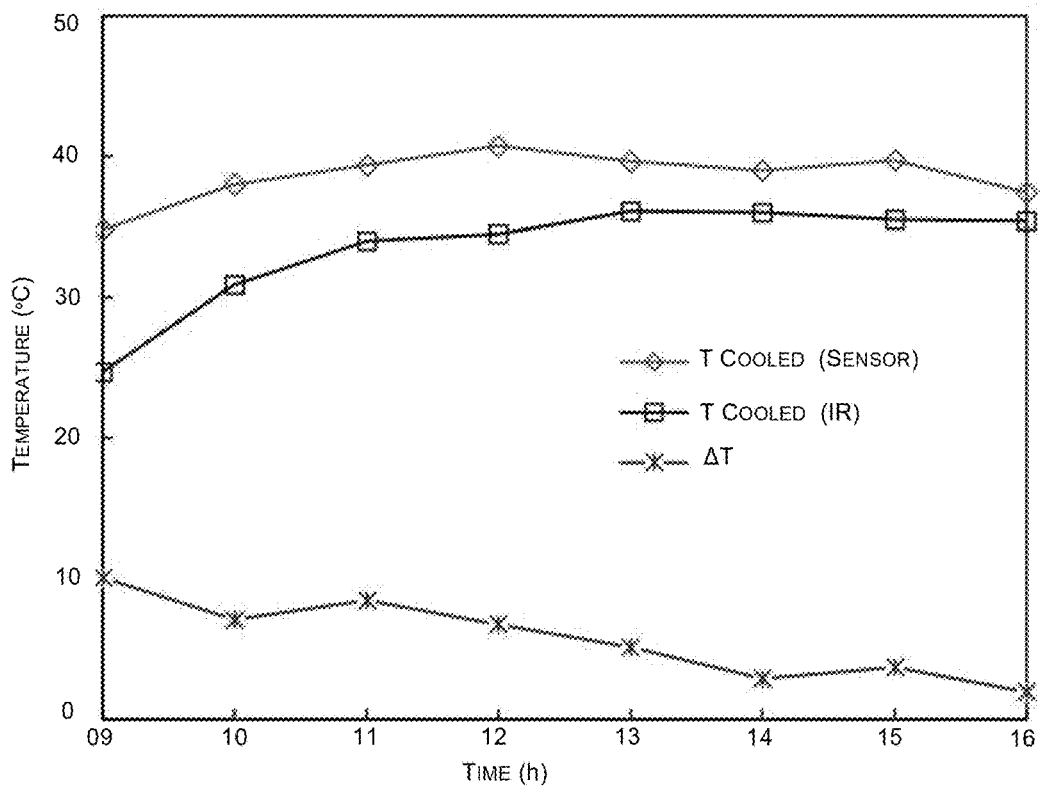
Figure 5J:
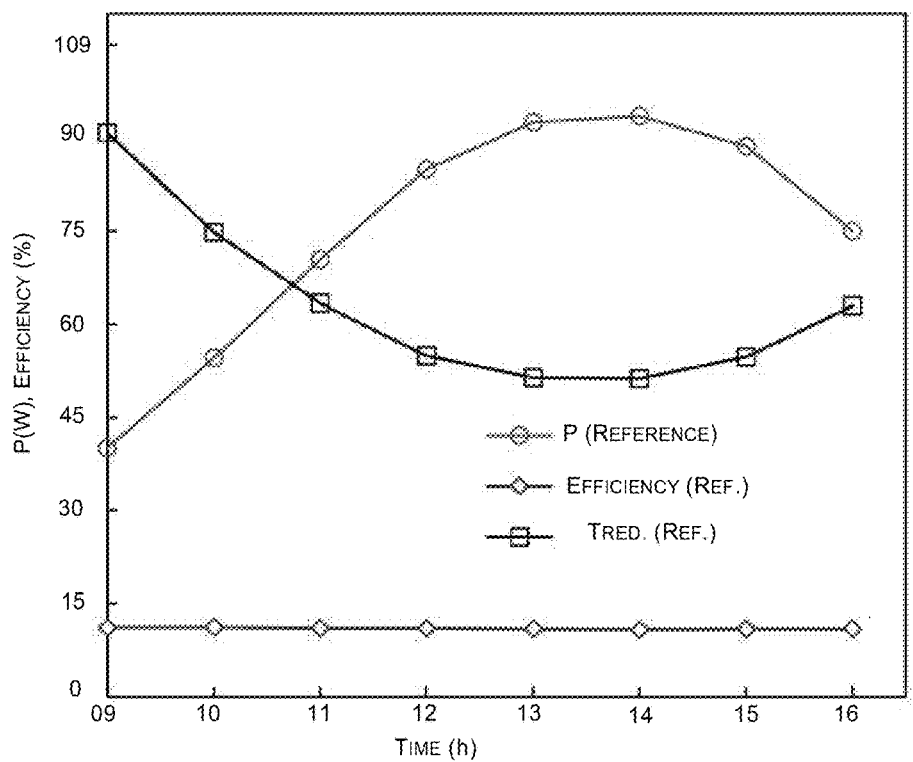

FIG. 5H shows an IR thermography profile of a conventional SPV (also referred to as the reference hereinafter) as shown in FIG. 4 and the proposed system in FIG. 1. The measurement is taken under the illumination of the sun. In an exemplary implementation, an incident solar irradiance causes the generation of electricity as well as heat in the solar cells that can be recorded by IR thermography. The method is fast and contactless, and it can be used during normal operation of the PV plant. It is advised to perform thermal imaging on a sunny day with sun irradiance of at least 600 W/m2. The temperature of the solar cell inside a module varies within the range of a few degrees Celsius. If the electrical resistance of any solar cell increases, the surface temperature of that particular cell will be significantly higher than the rest of the SPV panel and it can be observed through IR imaging. General guidelines that should be considered are provided in IEC 62446-1:2016 standards but not limited to the like.

In an exemplary implementation, the thermograms can be recorded by the IR camera to visualize the temperature and its distribution on the surface of the SPV panel. The image was taken through a fluke tiX620 IR camera with a resolution of 1 h. It can be observed that the temperature of the panel with back cooling is less than the referenced panel temperature in all cases. The temperature of the reference solar panel increases and reaches its maximum at 2:00 p.m., while the surface temperature of the solar panel with back cooling is significantly lower. The distribution of temperature over the SPV panel surface with back cooling is non-uniform. This is due to the distance of the lower edge of the SPV panel which is far from the exhaust fan outlet compared to the upper edge as shown in FIG. 5H. The gradual increase in temperature can be observed as the distance increases from the top to the lower edge of the examined SPV panel. The average front surface temperature of the solar panel is observed through the IR camera and the back-surface temperature is recorded through the PT-100 sensor, as demonstrated in FIGS. 5I and 5J for both the reference and cooled solar panels. The average temperature difference of 12.45° C. is noted in the case of the referenced solar panel and 5.77° C. in case of the examined solar panel due to additional convective heat dissipation through back cooling of the SPV panel. Less temperature difference will result in less thermal stress, which will also enhance the total life span of SPV panels. The reduced temperature $T_{red}$m term is given by $T_{red}=T_{IR}/G$, and can be included in order to include the variation of temperature and irradiance, simultaneously. $T_{IR}$ is the front surface temperature recorded through IR thermography. The reduced temperature value is high in the morning and will decrease with the increase in solar irradiance. The baseline value of $T_{red}$ at STC is 0.025 at which the output power of the SPV panel will be maximum.

Figure 5K:
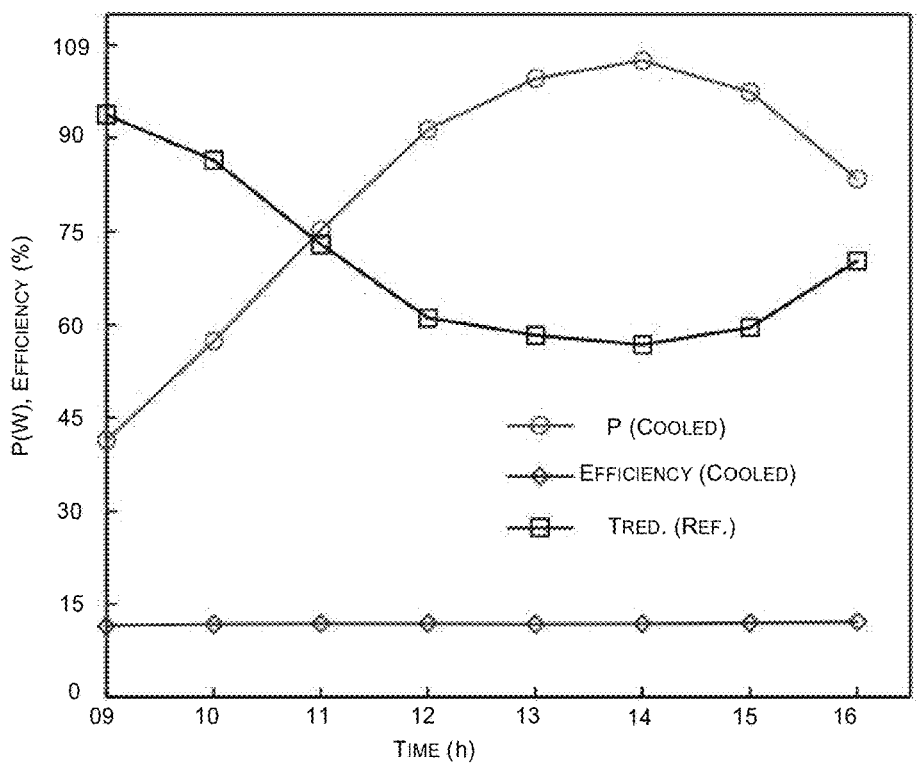

In an exemplary implementation, the variations in power production and electrical efficiency have been presented in FIG. 5K along with the reduced temperature of the reference and cooled SPV panels. The reduced temperature of the reference and cooled SPV panels are 0.10 and 0.07 respectively, at 9:00 a.m. These values tend to decrease and drop to the lowest value of 0.06 and 0.04, respectively, at 2:00 p.m., when the irradiance value is maximum on the plane of the solar panel.

FIG. 6 illustrates an exemplary representation of a wind turbine unit, in accordance with an exemplary embodiment of the present disclosure. As illustrated, in FIG. 6, use or recovery of the exhaust air from the air conditioning system to produce renewable electricity using wind turbine. The average wind speed from the exhaust HVAC system is about 8 m/s. If a wind turbine with a power capacity of 1 kW is used, a wind speed about 14-15 m/s is needed to get the maximum power output. If the same wind turbine is used, the power output using the exhaust air of the HVAC system (U=8 m/s) is about 0.33 kW. The results showed that 33% of the maximum power output from this wind turbine is recovered using the air from HVAC system. This exhaust air from the HVAC system is used for both the cooling (T=29° C.) of solar PV (reduce the solar cell temperature, and increase the solar PV power and energy generation, and electrical efficiency) and renewable electricity generation from wind turbine (U~8 m/s). This exhaust air from building HVAC system can be recovered and used for the development of hybrid solar PV-Thermal and wind turbine power system (waste to energy system—WTE or Energy-from-Waste).

Figure 7:
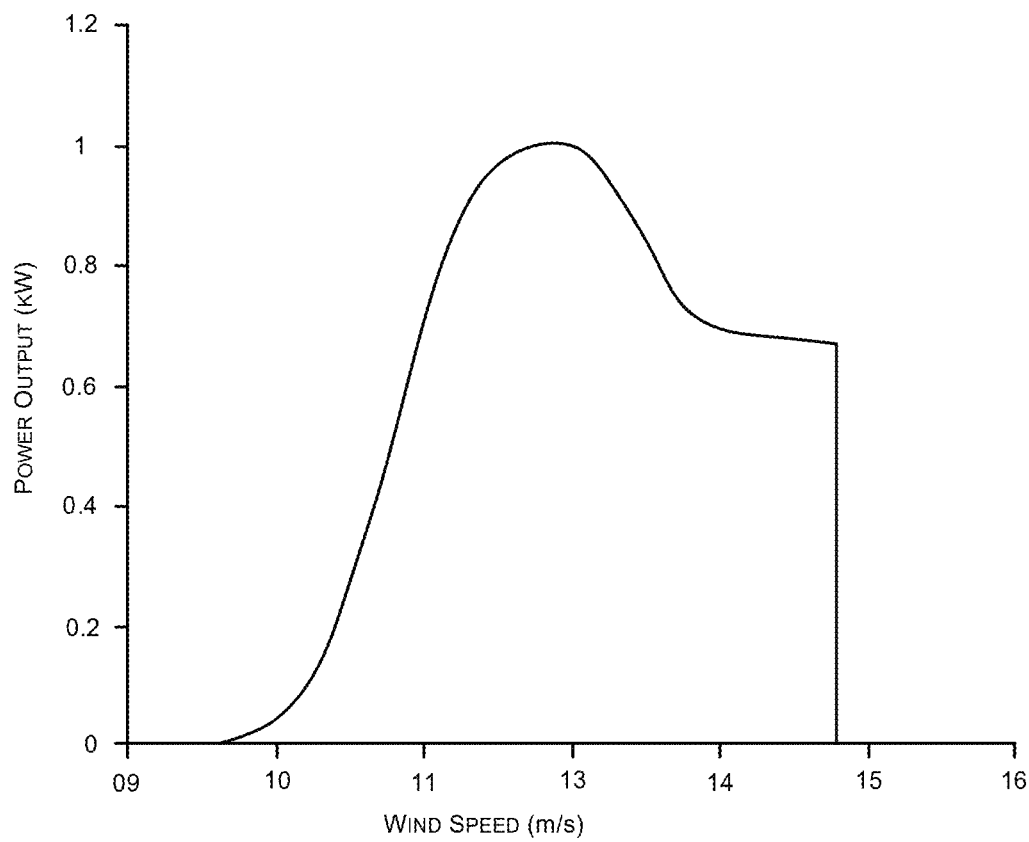
FIG. 7 illustrates representation of exemplary analysis of the wind turbine unit, in accordance with an exemplary embodiment of the present disclosure.

FIG. 7 illustrates representation of exemplary analysis of the wind turbine unit, in accordance with an exemplary embodiment of the present disclosure. In an exemplary implementation, FIG. 7 shows a Wind Turbine Power Curve with 1 KW wind turbine—maximum power of 1 kW at U=14-15 m/s. The Power Output from the wind turbine using the exhaust air of the HVAC system (U=8 m/s)=0.33 kW (33% of the maximum power output from this wind turbine is recovered using the air from HVAC system).

Thus, the present disclosure provides for an efficient and enhanced cooling system that uses waste air and directs the waste air towards solar panels to reduce the operating temperature and increase the overall performance such as power generation, electrical efficiency, and lifespan, and the like of the system. In exemplary implementations, the exhaust fan of the central air conditioning unit with an exhaust air temperature 29° C. has been reduced from 56.36° C. to 38.31° C. The reduction of operating temperature up to 18.05° C. has been achieved with 8.1 m/s wind speed at the average irradiance value of 647.83 W/m2 and the average ambient temperature of 37.33° C. The proposed system further can further facilitate excellent results for the cooling of the solar PV compared to the reference solar PV without cooling which are reduction by 32.03% in the operating solar cell temperature compared to conventional (without cooling) solar PV panel, an enhancement in electrical generated power by 8.65% compared to the conventional solar PV panel (no cooling) and an improvement by 8.76% in electrical efficiency compared to the conventional solar PV panel (no cooling).

The present disclosure provides for a novel PV cooling system of the waste air of the air conditioning system in managing the lower operating temperature, especially in the peak summer season, provides for a novel PV cooling system that enhances the performance of the SPV panel by keeping lower operating temperature and provides for a novel PV cooling system that ensures development of a correlation between IR-measured temperature and electrical power by the SPV panel for remote performance evaluation.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The invention claimed is:

1. A cooling system facilitating thermal management in a solar photovoltaic (PV) module, said system comprising:
    an exhaust fan, wherein the exhaust fan is operatively coupled to an outlet of a central air conditioning module, said outlet configured to carry waste air from the central air conditioning module,
    a supporting structure placed at a pre-defined distance in front of the exhaust fan, said supporting structure configured to support one or more solar panels such that a back unit of each of the one or more solar panels faces a front portion of the exhaust fan, with no additional mechanical structure in between, allowing exhaust air to spread freely from right and left sides, which are kept open in order not to restrict the path of airflow; and
    wherein the one or more solar panels are tilted at a predefined angle relative to the horizon and a predefined azimuth from the South configured to provide maximum surface area of the back units of the one or more solar panels, such that the one or more solar panels are directly in front of the exhaust fan, and wherein said exhaust fan being configured to direct the waste air and surrounding air towards the back units of the one or more solar panels, thereby reducing the operating temperature of the one or more solar panels.

2. The cooling system as claimed in claim 1, wherein a plurality of devices is coupled to the cooling system.

3. The cooling system as claimed in claim 2, wherein the plurality of devices is further coupled to one or more computing devices.

4. The cooling system as claimed in claim 3, wherein the plurality of devices comprises a plurality of irradiance sensors, a plurality of temperature sensors, one or more anemometers, and one or more infrared (IR) cameras.

5. The cooling system as claimed in claim 4, wherein the plurality of irradiance sensors is configured to sense and collect a set of irradiance signals from the system.

6. The cooling system as claimed in claim 5, wherein the one or more computing devices are configured to receive a set of data packets, wherein the set of data packets comprise the set of irradiance signals.

7. The cooling system as claimed in claim 6, wherein one or more computing devices are configured to monitor the cooling system based on the set of data packets received.

8. The cooling system as claimed in claim 4, wherein the plurality of temperature sensors is configured to sense and collect a set of temperature signals from the cooling system.

9. The cooling system as claimed in claim 4, wherein the one or more anemometers are configured to sense and collect a set of wind speed and direction from the cooling system.

10. The cooling system as claimed in claim 4, wherein one or more IR cameras are configured to collect a set of images from the cooling system, wherein the IR images correlate to power output by the one or more solar panels.

11. The cooling system as claimed in claim 1, wherein a wind turbine is configured to harvest potential energy from the waste air from the exhaust fan and convert the potential energy into electric energy.

12. The cooling system as claimed in claim 1, wherein the one or more solar panels comprise at least two identical monocrystalline SPV panels.

13. The cooling system as claimed in claim 1, wherein the system provides a cooling configuration and a cooling strategy with a predefined temperature of at least 29° C. and a predefined air speed flow rate of at least 8 m/s for cooling the one or more solar panels.

14. The cooling system as claimed in claim 1, wherein the predefined angle is 36° and the predefined azimuth is 120° south (north-west).

* * * * *